United States Patent [19]

Hama et al.

[11] Patent Number: 5,339,505

[45] Date of Patent: Aug. 23, 1994

[54] BAND-CLAMPING APPARATUS

[75] Inventors: Taira Hama, Chino; Tsugikichi Gomi, Nagano, both of Japan

[73] Assignee: Kabushiki Kaisha Mihama Seisakusho, Chino, Japan

[21] Appl. No.: 74,084

[22] Filed: Jun. 8, 1993

[30] Foreign Application Priority Data

Jun. 17, 1992 [JP] Japan .................................. 4-183042

[51] Int. Cl.⁵ .............................................. B23P 11/00
[52] U.S. Cl. .............................. 29/243.56; 29/243.57; 29/283.5
[58] Field of Search ............ 29/243.5, 243.56, 243.57, 29/243.58, 283.5, 505, 509, 524; 72/403

[56] References Cited

U.S. PATENT DOCUMENTS

| | | | |
|---|---|---|---|
| 1,466,051 | 8/1923 | Krantz | 72/403 |
| 2,348,957 | 5/1944 | Carvalho | 72/403 |
| 3,451,246 | 6/1969 | Miller et al. | 72/403 |
| 3,503,119 | 3/1970 | Seitz et al. | 29/243.57 |
| 3,797,077 | 3/1974 | Omori . | |
| 4,003,238 | 1/1977 | Oetiker . | |
| 4,884,432 | 12/1989 | Watson | 29/243.5 |
| 5,044,814 | 9/1991 | Hama . | |

*Primary Examiner*—Robert C. Watson
*Attorney, Agent, or Firm*—Jordan and Hamburg

[57] ABSTRACT

The present invention provides a band-clamping apparatus, which is capable of automatically clamping clamping bands wound. In the apparatus, a holding table holds a member to be clamped, which has been wound by the clamping band. A stopper prevents the clamping band on the member to be clamped, which has been held by the holding table, from moving, and the stopper is capable of contacting the holding pieces from the opposite side of a lever. A pushing arm turns the lever onto an outer face of a band section. A bending mechanism inwardly bends the holding pieces so as to secure the lever onto the outer face of the band section when the lever is located between the holding pieces. With the band-clamping apparatus of the present invention, manufacturing efficiency can be sharply raised, the clamping work can be executed safely, and the clamping strength can be maintain in the predetermined range.

10 Claims, 8 Drawing Sheets

BAND-CLAMPING APPARATUS

BACKGROUND OF THE INVENTION

The present invention relates to a band-clamping apparatus for automatically clamping a clamping band on a member to be clamped, e.g., boots used for automobile vehicles.

A clamping band for clamping, for example, said boots is disclosed in the U.S. Pat. No. 3,797,077. It is a ring-like metallic clamping band.

In the ring-like metallic clamping band, both ends of a band section are mutually bound by spot welding to form into a ring shape, and a lever is integrated with the ends by spot welding. A pair of holding pieces for securing the lever, which has reduced diameter of the band section by the action of lever, on the band section are provided thereon.

To clamp the boot with the clamping band, firstly the clamping band is set at proper position on the boot. Next, the lever is turned on its base end as a fulcrum point, so that the diameter of the band section is reduced and the boot is clamped. Further, a front end of the lever is secured on the band section by the holding pieces.

Another clamping band for clamping, for example, said boots is disclosed in the U.S. Pat. No. 5,044,814. It is a separated-type metallic clamping band. There is bored an engage hole at one end of a metallic band section, and a lever is fixed at the other end thereof by spot welding. The engage hole is opened in a part of a projected section, which is formed at the one end of the band section. A projected section which is formed at a fulcrum end of a lever is capable of fitting into the engage hole. Further, the clamping band also has holding pieces for securing the lever turned.

In the above described clamping bands, the lever is secured by the steps of turning the lever to reduce the diameter of the band section, and bending the holding pieces inward with a hammer. While bending the holding pieces, the lever is held to maintain the band section in a diameter-reduced state.

However, the above described conventional work is all manually executed by a worker. Therefore, there are the following disadvantages:

(1) It is almost impossible to maintain clamping strength in a predetermined range;

(2) Manual hammering work is dangerous because the worker sometimes hits his or her own hand; and (3) Manufacturing efficiency cannot be higher because of the manual work.

SUMMARY OF THE INVENTION

An object of the present invention is to provide a band-clamping apparatus, which is capable of automatically clamping a clamping band and of raising manufacturing efficiency of the clamping work.

To achieve the object, the band-clamping apparatus of the present invention has the following structures.

Firstly, a clamping band, which is clamped by the band-clamping apparatus, has a band section; a lever for reducing diameter of the band section wound on a member to be clamped, the lever being capable of turning on one end as a fulcrum point so as to reduce the diameter of the band section; and a pair of holding pieces for holding the lever on the band section so as to secure a diameter-reduced state of the band section.

In the apparatus of the present invention, a holding table holds the member to be clamped, which has been wound by the clamping band. A stopper prevents the clamping band on the member to be clamped, which has been held by the holding table, from moving, and the stopper is capable of contacting the holding pieces from the opposite side of the lever. A pushing arm turns the lever onto an outer face of the band section. A bending mechanism inwardly bends the holding pieces so as to secure the lever onto the outer face of the band section when the lever is located between the holding pieces.

With above described structures, the band-clamping apparatus of the present invention is capable of automatically executing the clamping work, so that manufacturing efficiency can be sharply raised; the clamping work can be executed safely; and the clamping strength can be maintained in the predetermined range.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described with reference to the accompanying drawings.

Figure 8:
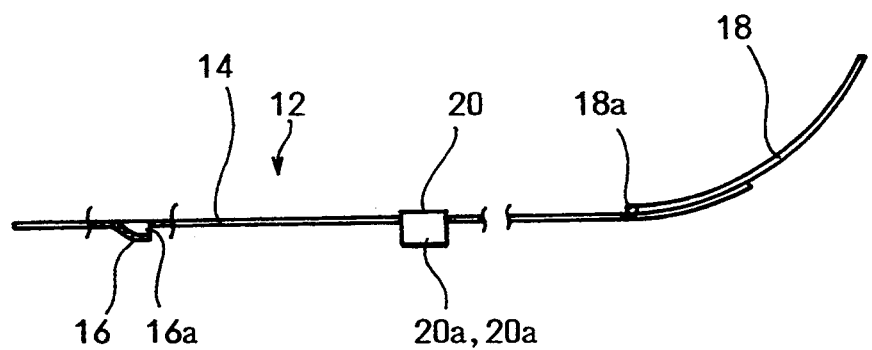
FIG. 8 is a side view showing a clamping band extended.

FIG. 8 is a side view of a clamping band 12, which will be treated by the band-clamping apparatus of embodiments.

As shown in FIG. 8, the clamping band 12 has a band section 14, which is formed into a band-like shape and made of a metal. There is formed a projected section 16 at one end of the band section 14, and the projected section 16 has an opening 16a. On the other hand, the other end of the band section 14 is fixed to a mid section of a lever 18 by spot welding. A projected section 18a, which is capable of fitting into the opening 16a of the projected section 16, is formed at an inner end of the lever 18. Furthermore, there is provided a clasp 20 for securing an outer end of the lever 18 on the band section 14. The projected section 18a of the lever is fitted into the opening 16a of the projected section 16, and the lever 18 is turned to clamp the clamping band 12. The clasp 20 secures the lever 18 after the lever 18 is turned. The clamping band 12 is the separated-type one, which is shown in said U.S. Pat. No. 5,044,814. Note that, when the lever 18 is fully turned, the lever 18 is located between holding pieces 20a and 20a of the clasp 20.

Figure 9:
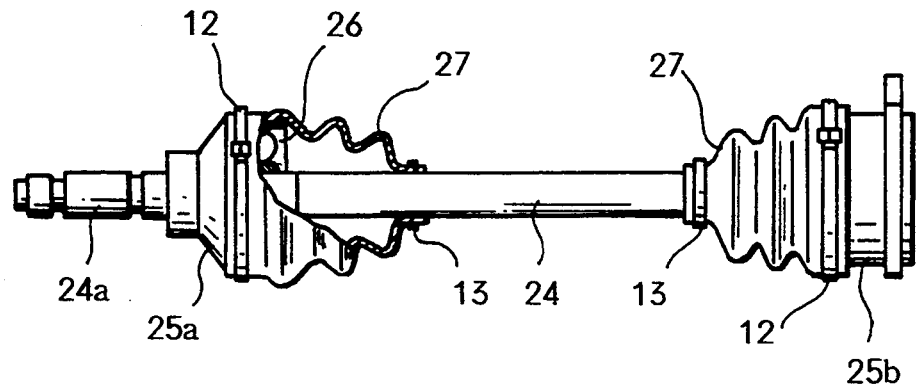
FIG. 9 is a partially sectional view showing a state of clamping one end of a constant velocity joint with the clamping band.

FIG. 9 is a partially sectional view showing a state of clamping boot 27 and 27 of constant velocity joints 26 with the clamping bands 12 and 12.

External members 25a and 25b are respectively connected to the constant velocity joints 26 for automobile vehicles, which are provided to each end of a shaft 24 (note that, one of two joints 26 is shown in FIG. 9). Each joint 26 is covered with the boots 27 and 27. In the boots 27 and 27, grease is filled as lubricant for the joints 26.

Both ends of the boots 27 and 27 are clamped by the clamping bands 12 and 13. The diameter of the clamping band 12 is greater than that of the clamping band 13.

The band-clamping apparatus for clamping the clamping band, which has been wound on the boot, by turning the lever will be explained.

Figure 1:
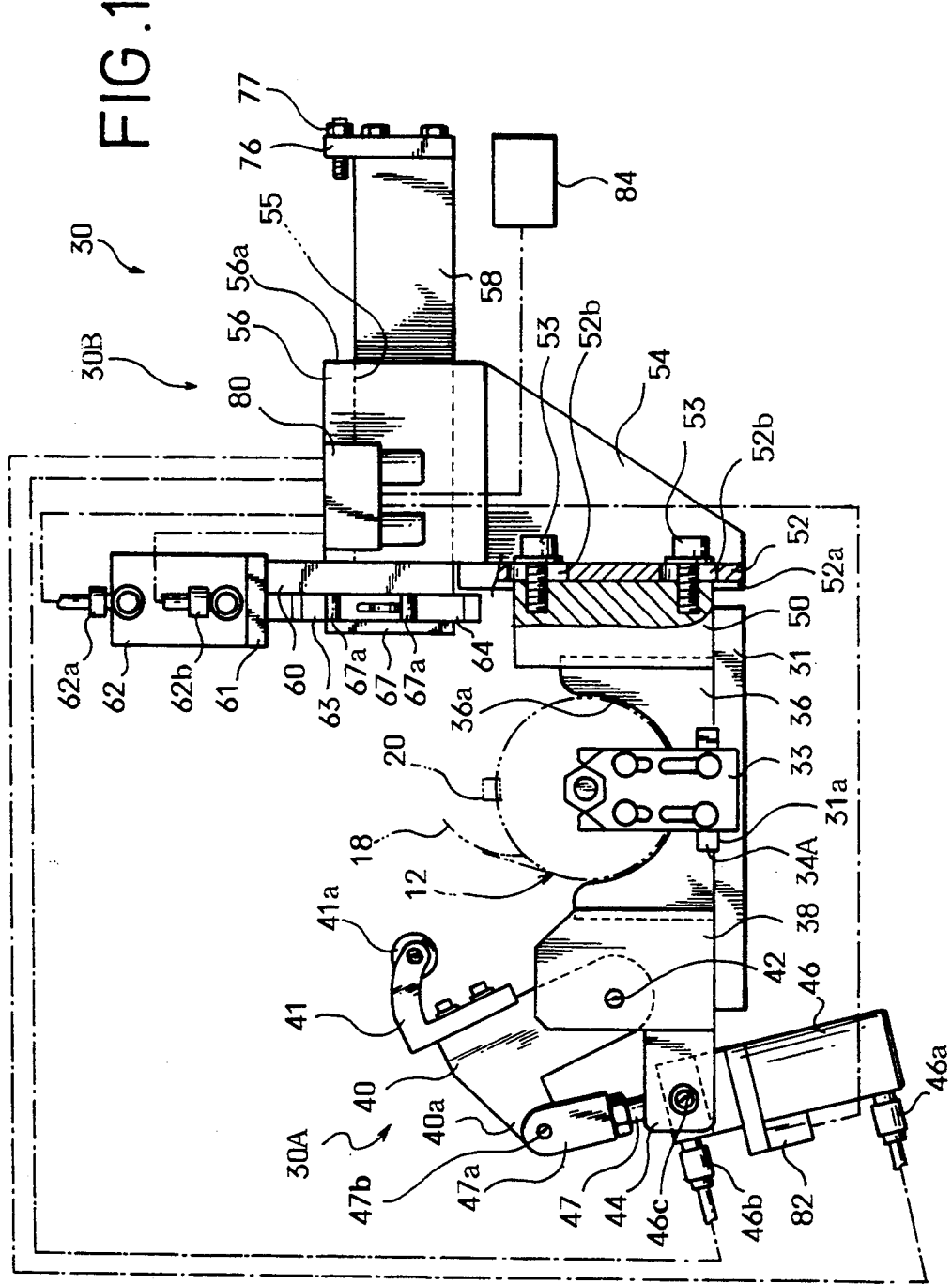
FIG. 1 is a partially sectional front view of an embodiment of the band-clamping apparatus.
Figure 2:
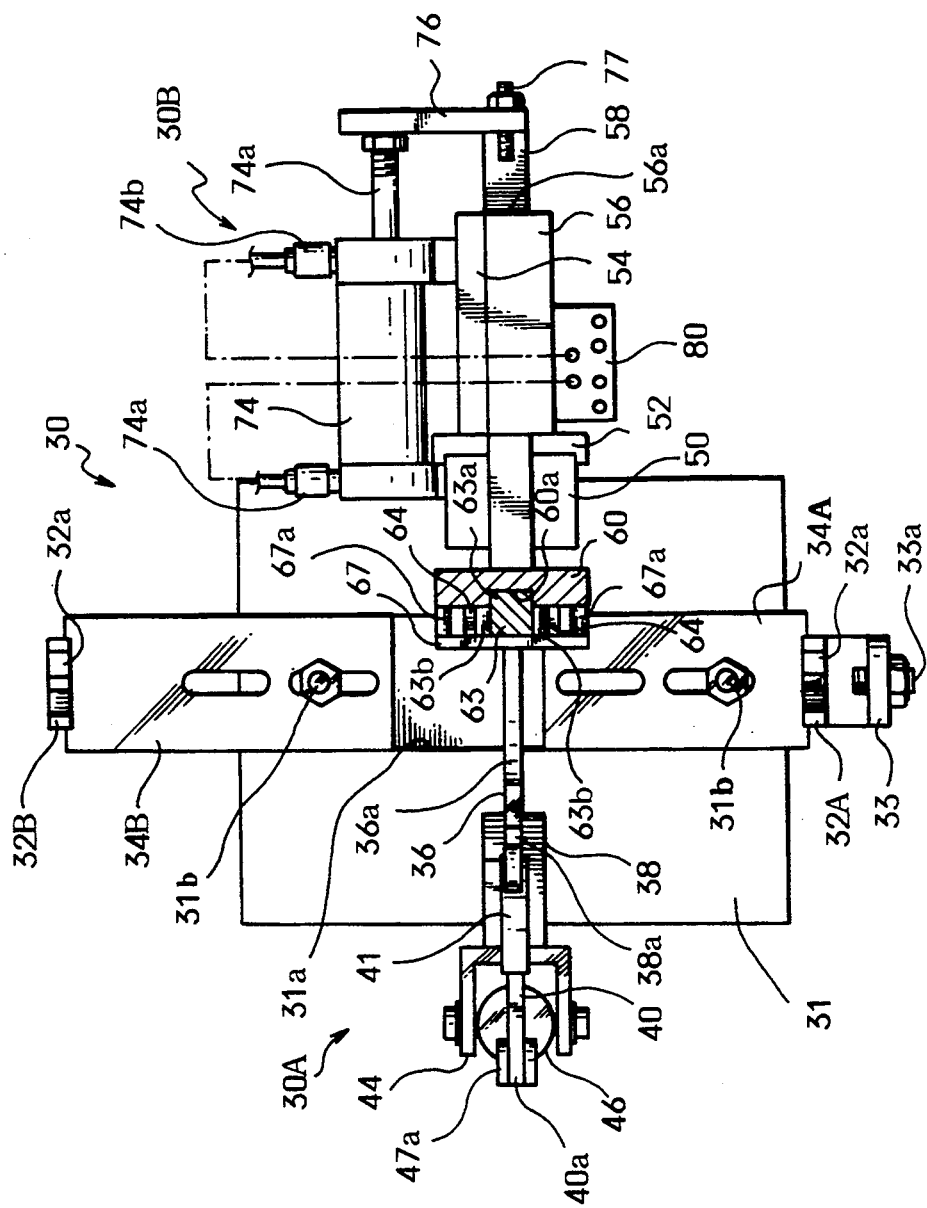
FIG. 2 is a partially sectional plan view of the embodiment.

FIG. 1 is a partially sectional front view of the apparatus. FIG. 2 is a partially sectional plan view of the apparatus.

A base board 31 has a shallow guide groove 31a in a center part. There are provided slide plates 34A and 34B, which are capable of mutually closing and separating away, in the guide groove 31a. There is fixed a supporting member 32A, which supports the shaft 24, on the slide plate 34A. On the other hand, there is fixed a supporting member 32B, which supports a shaft 24a extended outward from the external member 25a, on the slide plate 34B. Locations of the slide plates 34A and 34B are necessary to adjust according to a size of the boot 27. The locations of the slide plates 34A and 34B can be adjusted by sliding along the guide groove 31a. The slide plates 34A and 34B can be fixed on the base board 31 by bolts 31b and 31b.

There are formed V-notches 32a and 32a in each top section of the supporting members 32A and 32B. A stopper plate 33 is provided beside the supporting plate 32A. The stopper plate 33 has a bolt 33a, which is capable of determining and adjusting a location of the shaft 24a supported on the V-notch 32a of the supporting member 32A.

FIGS. 1 and 2 show a state of clamping the clamping band 12.

Next, mechanisms for clamping the clamping band 12 will be explained.

A holding table 36 is fixed on the base board 31, crossing the guide groove 31a. The clamping band 12 (shown as two-dot chain lines in FIG. 1) is set onto the holding table 36, and the clasp 20 is located at an uppermost position. Note that, the holding table 36 has a circular concave section 36a in which a lower part of the clamping band 12 can be supported. And thickness of the holding table 36 is almost the same as width of the clamping band 12.

There is provided a diameter reduction mechanism 30A for turning the lever 18 of the clamping band 12 on the left side of the holding table 36. On the other hand, there is provided a bending mechanism 30B for fixing the lever 18 by the clasp 20 on the right side of the holding table 36. Note that, the holding table 36 can be changed according to the size of the clamping band 12.

Firstly, the diameter reduction mechanism 30A will be explained.

In FIG. 1, there is provided a fixed block 38 next to the holding table 36, on the left side. The fixed block 38 has a slit 38a on an upper face. In the slit 38a, a lower part of a pushing arm 40 is inserted. The pushing arm 40 is capable of rotating on a first axis 42.

A supporting frame 44, which has a U-shape in plan view, is fixed on an outer face of the fixed block 38. A cylinder unit 46 is rotatably provided to the supporting frame 44. The cylinder unit 46 is capable of rotating on a second axis 46c, whose axial line is parallel to that of the first axis 42. There is provided a connector 47a at a front end of a cylinder rod 46 of the cylinder unit 47. The connector 47a is rotatably connected to an extended section 40a of the pushing arm 40 by an axis 47b. Thus, the cylinder unit 46 rotates in the clockwise direction (in FIG. 1) to rotate the pushing arm 40 in the same direction when the cylinder rod 47 of the cylinder unit 46 extends.

Furthermore, an L-shaped pusher 41 for turning the lever 18 is provided in an upper section of the pushing arm 40, on the holding table 36 side. A front end section of the pusher 41 is branched in Y shape, and a roller 41a is rotatably held in the Y-shaped section. Thus, the roller 41a pushes the lever 18 to turn when the pushing arm 40 rotates. Note that, the roller 41a pushes the lever 18 without interference with the clasp 20. The lever 18 which has been fully turned is located between the holding pieces 20a and 20a of the clasp 20.

Next, the bending mechanism 30B will be explained.

A fixed block 50 is fixed on the base board 31, on the right side of the holding table 36. There is fixed a fixed plate 52 on an outer face of the fixed block 50.

Figure 3:
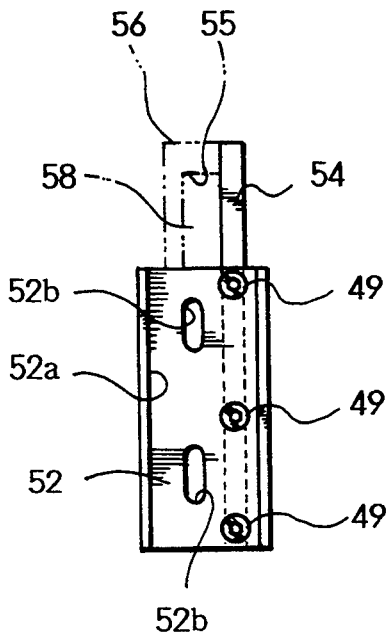
FIG. 3 is an explanation view showing an attaching plate and a fixed plate.

There is grooved a guide groove 52a, on the fixed block 50 side, on the fixed plate 52. A side section of the fixed plate 52 is fitted in the guide groove 52a. There are bored long holes 52b and 52b, which are elongated in the vertical direction, in the fixed plate 52. The fixed plate 52 is fixed to the fixed block 50 by bolts 53 and 53, which are pierced through the long holes 52b and 52b. With this structure, the position of the fixed plate 52 with respect to the fixed block 50 can be changed in the vertical direction within a range corresponding to the length of the long holes 52b and 52b. An attaching plate 54 is vertically fixed to the fixed plate 52 by bolts 49, 49 and 49 (see FIG. 3).

There is fixed a guide cover 56, whose sectional shape is a U-shape, in an upper section of the attaching plate 54. The attaching plate 54 and the guide cover 56 make a rectangular guide space 55. A slide block 58 is slidably inserted in the guide space 55. The length of the slide block 58 is almost twice as long as that of the guide cover 56.

A base plate 60 is fixed on a front face of the slide block 58. A horizontal plate 61 is fixed on a top section of the base plate 60. There is provided a cylinder unit 62 on the horizontal plate 61.

Detailed structures of the apparatus will be explained with reference to FIGS. 4–7.

A shallow vertical groove 60a is grooved on a front face of the base plate 60. A guide section 63a, which is formed on a rear face of a punch 63, is fitted in the groove 60a (see FIG. 6). The punch 63 is capable of vertically moving along the groove 60a. The punch 63 is connected to a cylinder rod 62r of the cylinder unit 62. Thus, the punch 63 is vertically moved by extension and contraction of the cylinder rod 62r.

There are provided a pair of claws 64 and 64 in a lower section of the front face of the base plate 60. The claws 64 and 64 are provided on each side of the groove 60a. The claws 64 and 64 are capable of rotating on axes 66 and 66. Upper part faces of the claws 64 and 64, which are mutually facing, are slopes 64a and 64a, whose distance gets smaller downward. The claws 64 and 64 respectively have through-holes 64b and 64b (see FIGS. 5(a) and 5(b)). There are provided rollers 65 and 65 in each through-hole 64b and 64b. The rollers 65 and 65 are capable of rotating on each axis 66 and 66, which is parallel to the axes 65a and 65a.

There are provided pins 69 and 69 on upper part faces of the claws 64 and 64. Both ends of a spring 70, which is an example of a biasing means, are respectively fixed to the pins 69 and 69. Thus, the spring 70 always biases the upper parts of the claws 64 and 64 to close each other. By the spring 70, the rollers 65 and 65 always contact side faces of the punch 63. There are formed cams 63b and 63b in the mid sections of the side faces of the punch 63. The cams 63b and 63b are expanded in the width direction of the punch 63.

Figure 4:
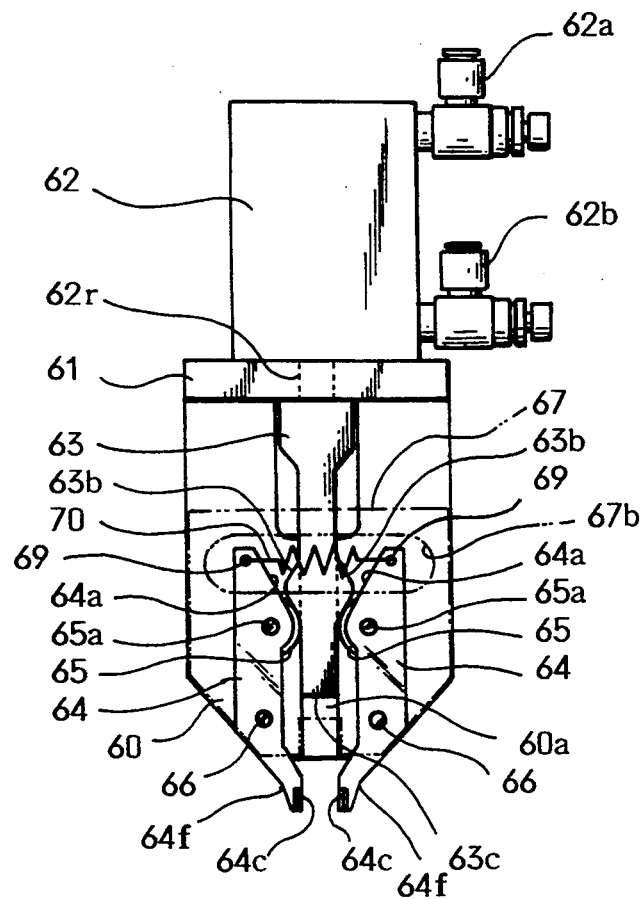
FIG. 4 is a front view of a bending mechanism for bending holding pieces.
Figure 5A:
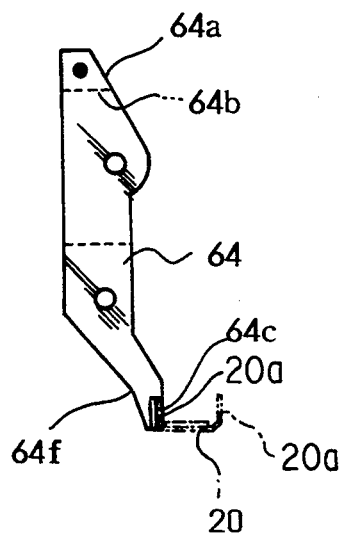
FIG. 5(a) is a front view of a claw.
Figure 5B:
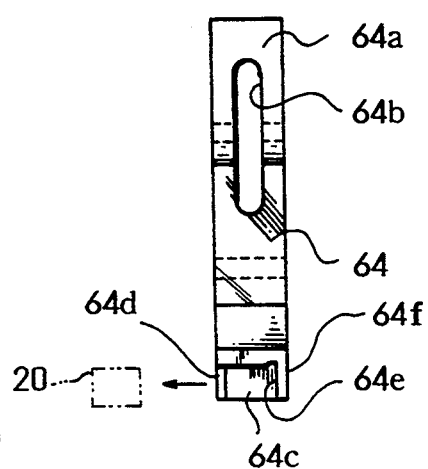
FIG. 5(b) is a side view of the claw.
Figure 6A:
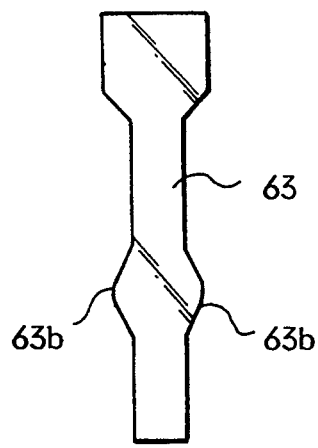
FIG. 6(a) is a front view of a punch.
Figure 6B:
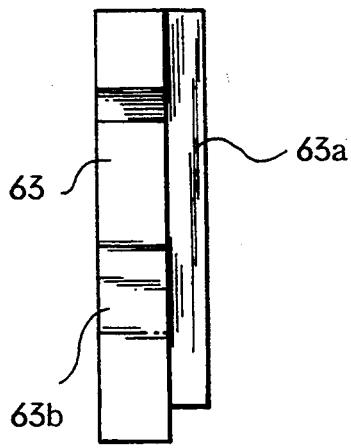
FIG. 6(b) is a side view of the punch.
Figure 7A:
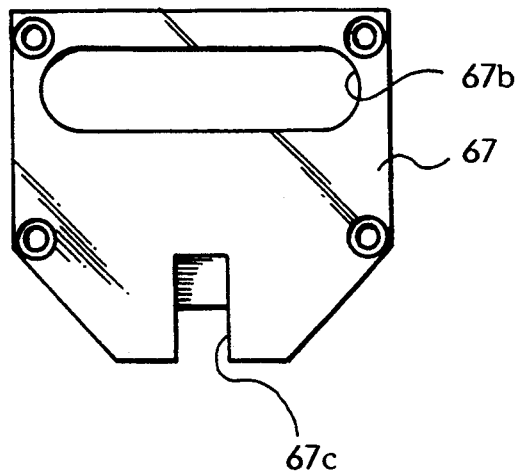
FIG. 7(a) is a front view of a cover for covering over a front face of the claws.
Figure 7B:
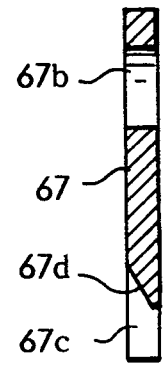
FIG. 7(b) is a side view of the cover.

The front faces of the claws 64 and 64 are covered with a cover 67 (shown by two-dot chain lines in FIG. 4). There is formed a predetermined gap between the cover 67 and the base plate 60 by a spacer 67a (see FIGS. 1 and 2). Note that, the cover 67 has a through-hole 67b corresponding to the spring 70. And the cover 67 has a notch 67c in a lower center part. An inner upper face of the notch 67c is a slope 67d (see FIGS. 7(a) and 7(b)).

In FIG. 4, the punch 63 is in an uppermost position or in a stand-by state. The rollers 65 and 65 of the claws 64 and 64 contact the side faces of the punch 63, and whose positions are lower than the cams 63b and 63b thereof. In this state, when the cylinder rod 62r of the cylinder unit 62 is extended downward, the punch 63 moves downward. With the down movement of the punch 63, the rollers 65 and 65 of the claws 64 and 64 get over the cams 63b and 63b. While the rollers 65 and 65 roll on the cams 63b and 63b, tip sections 64f and 64f of the claws 64 and 64 gradually close each other, so that the holding pieces 20a and 20a are bent slightly inward.

There are formed concave sections 64c and 64c in the tip sections 64f and 64f of the claws 64 and 64. When the claws 64 and 64 move close to the clasp 20, the holding pieces 20a and 20a of the clasp 20 of the clamping band 12, which has been held on the holding table 36, come into the concave sections 64c and 64c. The clasp 20 side of the concave sections 64c and 64c are opened. And an opened edge 64d of the concave sections 64c and 64c is a slope so as to smoothly introduce the holding pieces 20a and 20a in the concave sections 64c and 64c. There is formed a stopper wall 64e in a rear side of the concave sections 64c and 64c. If the holding pieces 20a and 20a come into contact with the stopper wall 64e, the holding pieces 20a and 20a are set at predetermined positions. The stopper wall 64e works as a stopper for preventing the clamping band 12 from rotating while the pushing arm 40 turns the lever 18 (FIGS. 5(a) and 5(b)).

There is fixed a cylinder unit 74 for driving the slide block 58 on a rear face of the attaching plate 54. A front end of a cylinder rod 74a of the cylinder unit 74 and a front end of the slide block 58 are connected by a connector 76 (see FIG. 2). Thus, the slide block 58 is reciprocally moved by the cylinder unit 74.

An upper part of the connector 76 is projected from the slide block 58 upward. An adjusting screw 77 is provided at the projected part. A front end of the adjusting screw 77 is capable of contacting an end face 56a of the guide cover 56 so as to limit forward movement of the slide block 58.

There is fixed a controller 80 on a front face of the guide cover 56. The controller 80 controls the cylinder units 46, 62 and 74. The cylinder units 46, 62 and 74 respectively have ports 46a and 46b, ports 62a and 62b and ports 74a and 74b. Compressed air for driving the cylinder units 46, 62 and 74 is supplied to or discharged from the ports 46a, 46b, 62a, 62b, 74a and 74b.

The cylinder unit 46 has a sensor 82 for detecting a position of a piston. The sensor 82 works as a switch for driving the cylinder unit 62, and is electrically connected to the controller 80. Namely, when the sensor 82 detects that the piston of the cylinder unit 46 reaches a position of the sensor 82, the controller 80 drives the cylinder unit 62.

Note that, when the piston of the cylinder unit 46 reaches a position of the sensor 82, the lever 18 has been turned until reaching the band section whose diameter has been reduced.

The controller 80 is electrically connected to a compressor 84 (see FIG. 1). The supply of compressed air to the cylinder units 46, 62 and 74 is controlled by the controller 80.

Successively, the action of the apparatus 30 will be explained.

(1) The shaft 24 and the shaft 24a of the external member 25a are set in the V-notches 32a and 32a of the supporting members 32A and 32B, and the clamping band 12 is set on the holding table 36. At that time, the clasp 20 of the clamping band 12 should be set at uppermost position.

(2) The slide block 58 is moved forward by the cylinder unit 74. Then the holding pieces 20a and 20a of the clasp 20 come into the concave sections 64c and 64c of the claws 64 and 64 via the edge 64f. When the holding pieces 20a and 20a come into contact with the stopper wall 64e in the concave sections 64c and 64c, the positions of the holding pieces 20a and 20a are set at the predetermined positions.

Note that, if the clasp 20 is shifted to the right (in FIG. 1), the stopper wall 64e in the concave sections 64c and 64c rotate the clasp 20 in the counterclockwise direction by the forward movement of the slide block 58, so that the positions of the holding pieces 20a and 20a are set at the predetermined positions. Next, the cylinder unit 46 will be driven.

(3) While the holding pieces 20a and 20a are set at the predetermined positions, the cylinder unit 46 is driven. The cylinder rod 47 of the cylinder unit 46 is extended and the cylinder unit 46 rotates in the clockwise direction, so that the pushing arm 40 rotates on the first axis 42. By the rotation of the pushing arm 40, the roller 41a of the pusher 41 pushes and turns the lever 18.

While the lever 18 is turned, the lever 18 passes through the notch 67c of the cover 67, which covers over the claws 64 and 64, and the tip sections 64f and 64f, so that the lever 18 reaches the position between the holding pieces 20a and 20a. During the period when the lever 18 is turned, no interference between the roller 41a of the pusher 41 and the holding pieces 20a and 20a occurs.

Note that, if the clasp 20 of the clamping band 12 is shifted to the left on the holding table 36, the positions of the holding pieces 20a and 20a are not set at the predetermined positions in the concave sections 64c and 64c by the froward movement of the slide block 58. But the pusher 41 makes the clamping band 12 rotate in the clockwise direction while the pusher 41 turns the lever 18, so that the holding pieces 20a and 20a are set at the predetermined positions in the concave sections 64c and 64c.

(4) While the lever 18 is turned, if the sensor 82 of the cylinder unit 46 detects the piston, the controller 80 drives the cylinder unit 62.

When the punch 63 moves downward by the cylinder unit 62, the rollers 65 and 65 of the claws 64 and 64 get over the cams 63b and 63b of the punch 63, so that the tip sections 64f and 64f mutually approach at once. At that time, the holding pieces 20a and 20a of the clasp 20 are bent slightly inward.

The punch 63 is further moved downward by the cylinder unit 62, and the bottom face of the punch 63 fully bends the holding pieces 20a and 20a to fix the lever 18.

Afterwards the cylinder units 46 and 62 are driven to contract their cylinder rods, so that the pushing arm 40 is rotated on the first axis 42 in the counterclockwise direction and the punch 63 is moved upward. Then the slide block 58 is moved backward.

In the above described embodiment, the height of the bending mechanism 30B is adjusted by changing the height of the fixed plate 52 with respect to the fixed block 50, but that may be adjusted by changing the height of the fixed block 50 with respect to the base board 31.

Figure 10:
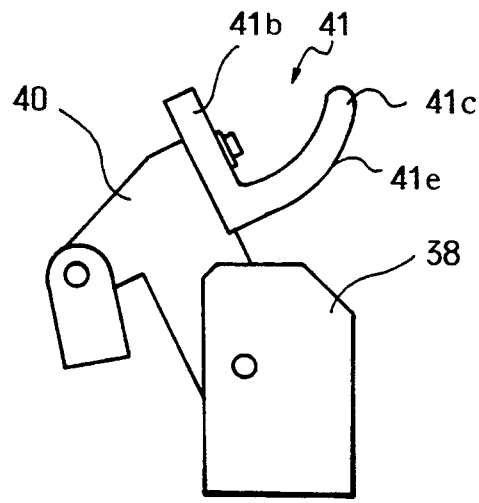
FIG. 10 is a front view of another example of a pusher.

As shown in FIG. 10, the pusher 41 of the pushing arm 40 may have an L-shape in a side view. The L-shaped pusher 41 includes a base section 41b for fixing, and a pushing section 41c, which is curvedly extended upward from a lower end section of the base section 41b. An outer curved face 41e of the pushing section 41c pushes the lever 18 to turn.

Figure 11:
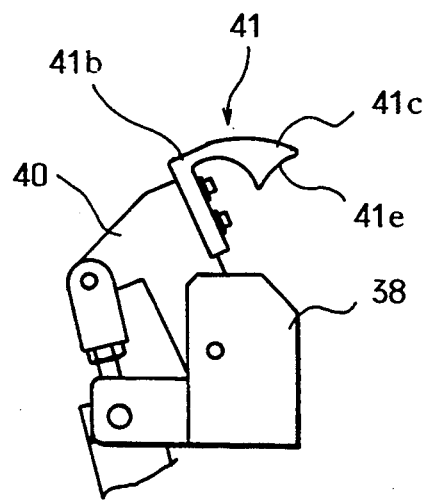
FIG. 11 is a front view of another example of a pusher.

Further, as shown in FIG. 11, the pusher 41 may include the base section 41b for fixing, and a pushing section 41c, which is curvedly extended downward from an upper end section of the base section 41b and which has an outer curved face 41e for pushing the lever 18.

As described above, the apparatus 30 clamps the clamping band 12. Next, an apparatus, which is capable of clamping the clamping bands 12 and 13, will be explained with reference to FIG. 12.

Figure 12:
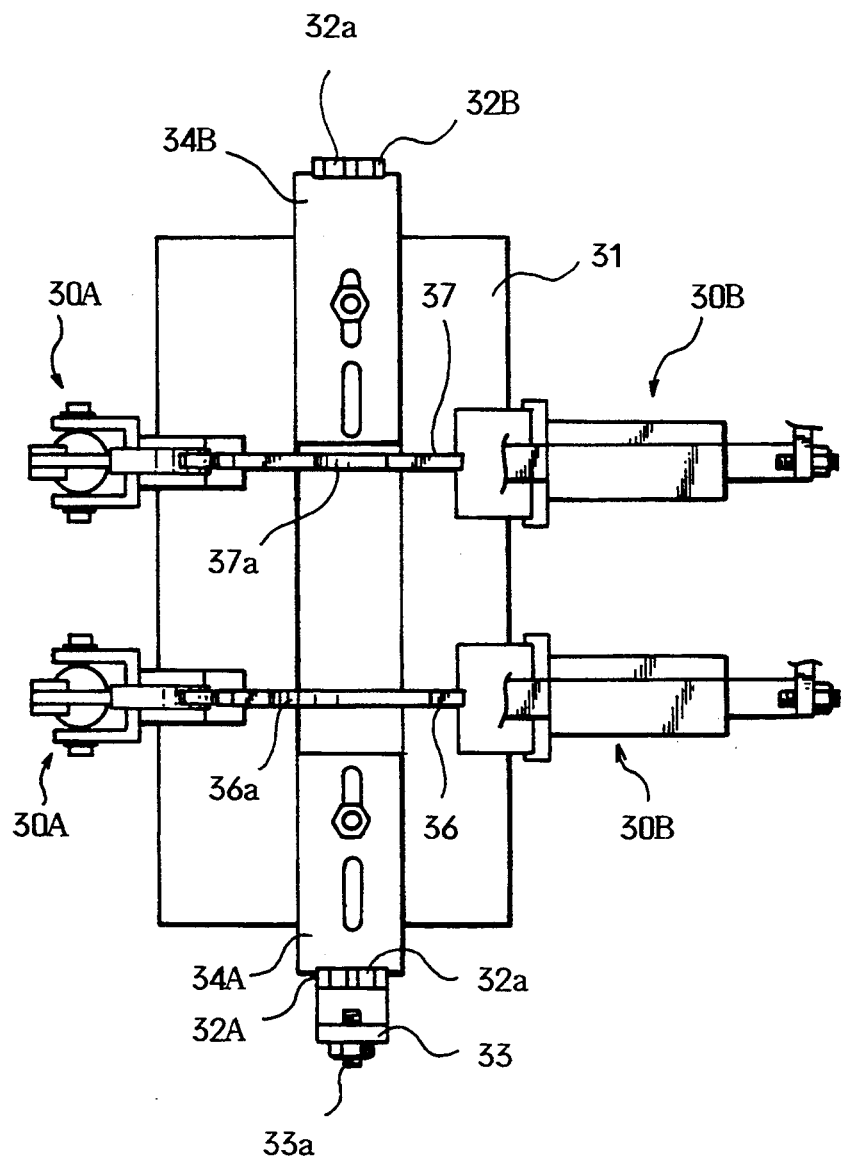
FIG. 12 is a plan view of another embodiment of the band-clamping apparatus.

As shown in FIG. 12, the supporting members 32A and 32B are provided in both ends sections of the guide groove 31a of the base board 31. And there is provided a holding table 37, which is arranged parallel to and separated away the holding table 36, over the guide groove 31a. The holding table 37 has a circular concave section 37a on which the clamping band 13, whose diameter is smaller than that of the clamping band 12, is set.

The clearance between the holding tables 36 and 37 allows that the clamping bands 12 and 13 are respectively set on the circular concave sections 36a and 37a when the shafts 24 and 24a are respectively set in the V-notches 32a and 32b of the supporting members 32A and 32B.

Figure 13:
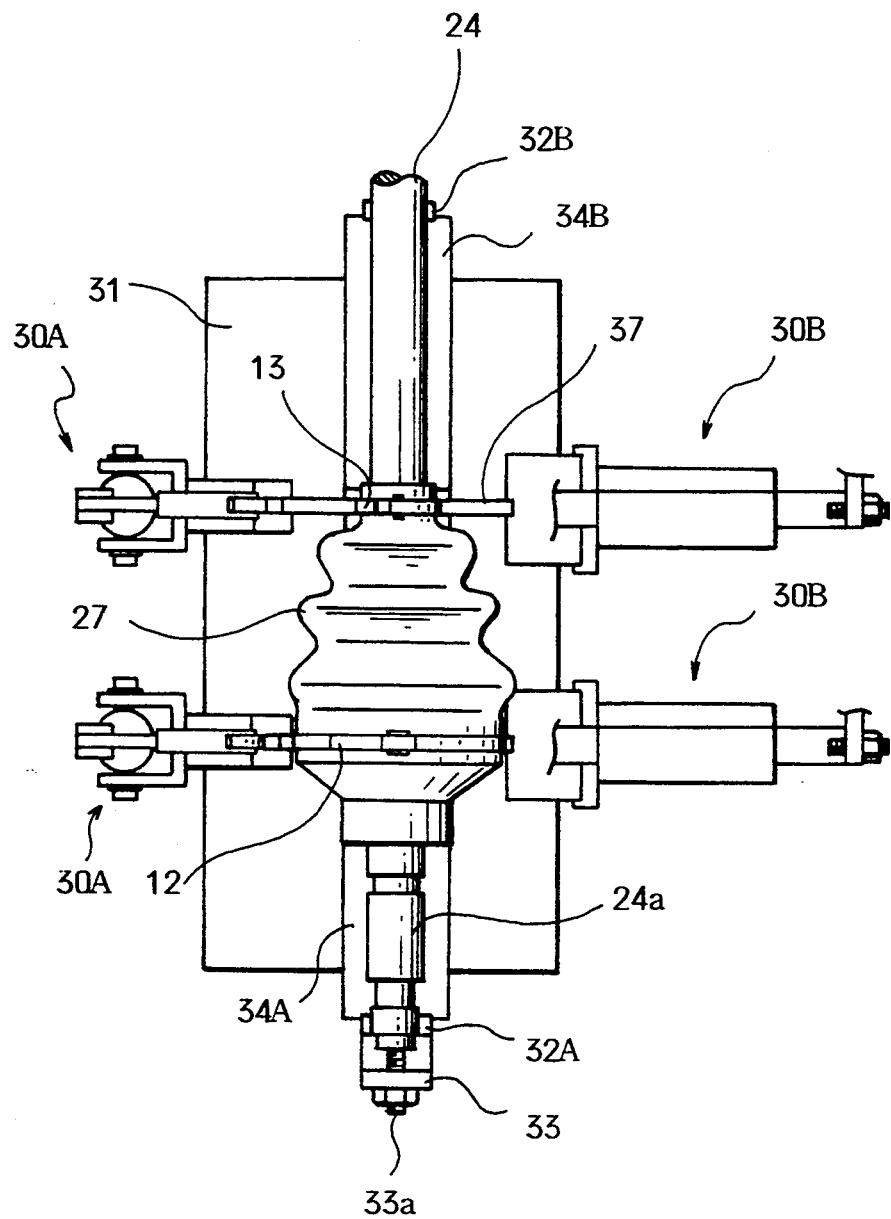
FIG. 13 is a plan view showing a state of setting the constant velocity joint on the apparatus shown in FIG. 12.

There are provided the diameter reduction mechanisms 30A and 30A and the bending mechanisms 30B and 30B on both sides of each holding table 36 and 37. With this structure, the clamping bands 12 and 13 of the boot 27 of the constant velocity joint 26 can be clamped simultaneously. FIG. 13 shows a state of setting the constant velocity joint with the clamping bands 12 and 13 on the apparatus.

In the above described embodiments, the stopper wall 64e of the claws 64 and 64 work as stoppers for preventing the clamping band 12 and/or 13 from rotating, another means for the same may be applied as stoppers.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A band-clamping apparatus for clamping a clamping band, which has: a band section; a lever for reducing a diameter of said band section wound on a member to be clamped, said lever being capable of turning on one end as a fulcrum point so as to reduce the diameter of said band section and a pair of holding pieces for holding said lever on said band section so as to secure a diameter-reduced state of said band section, comprising:
a holding table 36 for holding said member to be clamped, which has been wound by said clamping band;
a stopper for preventing said clamping band on said member to be clamped, which has been held by said holding table, from moving, said stopper being capable of contacting said holding pieces from a side opposite said lever;
a pushing arm for turning said lever onto an outer face of said band section; and
a bending mechanism for inwardly bending said holding pieces so as to secure said lever onto the outer face of said band section when said lever is located between said holding pieces.

2. The band-clamping apparatus according to claim 1, wherein both ends of said band section are fixedly bound, said lever is fixedly bound on one face of the bound section, and said holding pieces are provided on each edge of a part of said band section, adjacent said lever.

3. The band-clamping apparatus according to claim 1, wherein an inner end of said lever is capable of engaging with one end of said band section, said holding pieces are provided adjacent the one end thereof, and said lever is fixedly bound on one face of the other end of said band section.

4. The band-clamping apparatus according to claim 1, wherein said pushing arm is capable of rotating on a first axis, which is provided outside of said clamping band, when said member to be clamped, which is wound with said clamping band, is set to said holding table.

5. The band-clamping apparatus according to claim 1, further comprising a roller being provided at a front end of said pushing arm.

6. The band-clamping apparatus according to claim 1, wherein a front end of said pushing arm slightly separates away from said holding pieces when said pushing arm turns said lever.

7. The band-clamping apparatus according to claim 4, further comprising a cylinder unit being capable of rotating on a second axis which is parallel to the first axis, wherein a cylinder rod of said cylinder unit is connected to said pushing arm, and said pushing arm is rotated by extension and contraction of the cylinder rod of said cylinder unit.

8. The band-clamping apparatus according to claim 1, wherein said bending mechanism includes:
   a pair of claws being capable of approaching said holding pieces from outside so as to slightly bend said holding pieces inward; and
   a punch being capable of approaching said holding pieces, which have been slightly bent by said claws, so as to fully bend said holding pieces and to fix said lever on said band section.

9. The band-clamping apparatus according to claim 8, further comprising biasing means for always biasing tip sections of said claws to mutually separate away,
   wherein said claws are rotatably provided onto a base plate, and said punch is capable of reciprocally moving between said claws and has cams formed on each side face,
   whereby said cams contact said claws and close the front tip sections of said claws against said biasing means during said punch approaches to said holding pieces so as to slightly bend said holding pieces inward, then said punch fully bends said holding pieces.

10. The band-clamping apparatus according to claim 9, wherein said stopper is a section of each of said claws, said base plate is capable of moving close to and separating away from said holding pieces, and the stopper sections of said claws come into contact with said holding pieces from the opposite side of said lever when said base plate moves toward said holding pieces.

* * * * *